Sept. 13, 1966   G. KLEMT ETAL   3,272,073
HIGH-SPEED PHOTOGRAPHIC OR CINEMATOGRAPHIC VARIFOCAL OBJECTIVE
Filed Dec. 23, 1964
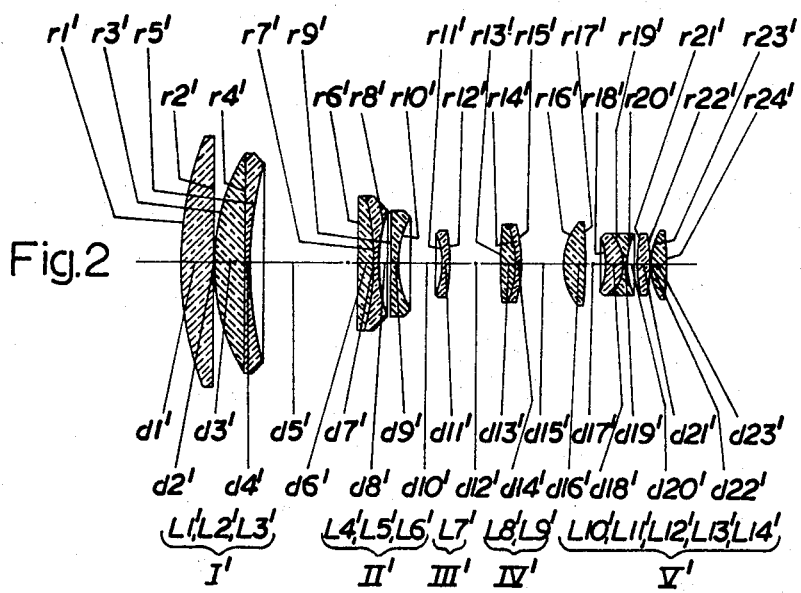
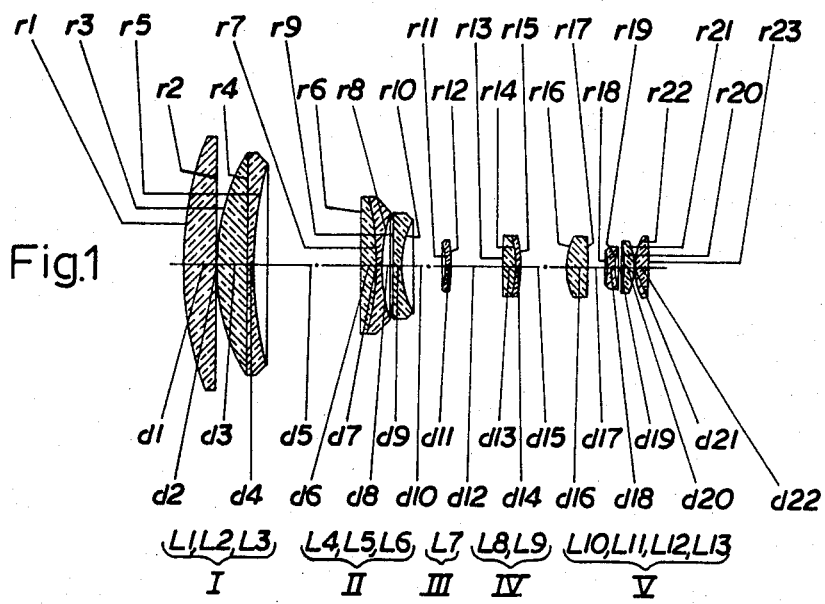
Günter Klemt
Karl Macher
INVENTORS.
BY Karl F. Ross
AGENT 3,272,073
HIGH-SPEED PHOTOGRAPHIC OR CINEMATO-
GRAPHIC VARIFOCAL OBJECTIVE
Günter Klemt and Karl Macher, both of Bad Kreuznach,
Germany, assignors to Jos. Schneider & Co., Optische
Werke, Bad Kreuznach, Germany, a corporation of
Germany
Filed Dec. 23, 1964, Ser. No. 420,727
Claims priority, application Germany, Feb. 17, 1959,
Sch 25,529; Aug. 5, 1960, Sch 28,268
6 Claims. (Cl. 88—57)

This application is a continuation-in-part of our copending application Ser. No. 126,306 filed July 24, 1961 and now abandoned.

The present invention relates to varifocal objectives for photographic or cinematographic cameras.

In our U.S. Patent No. 3,057,257, issued October 9, 1962, there has been disclosed a varifocal attachment for camera objectives designed to reduce the aberrations normally encountered in such systems, this attachment including a fixed positively refractive front component on the object side of the system, a fixed positively refractive rear component on the image side (i.e. next to the basic objective), and two movable intermediate components of negative refractivity. In accordance with the disclosure of the copending application, varifocal ratios of about 1:4 are realizable with relative apertures of 1:2.8 if the focal length of the fixed rear component is equal to or less than 75% of the focal length of the fixed front component and, simultaneously, the focal length of the more rearward movable component exceeds by at least 10% the focal length of the more forward movable component.

The general object of the present invention is to provide a further improvement over the system disclosed in our U.S. Patent No. 3,057,257 so as to afford greatly increased varifocal and/or aperture ratios in comparison therewith, with minimum residual aberrations which remain substantially constant throughout the range of adjustment.

The foregoing object is realized, in accordance with a feature of this invention, by so dimensioning the positive front component of an essentially afocal attachment that the ratio of its focal length to that of the principal objective, which in the specific numerical example given in our aforementioned patent is greater than 4.5:1, is reduced to less than 4:1 and if, concurrently, the first, more forwardly positioned movable component is constituted by two closely juxtaposed dispersive lens members separated by an air space preferably also of dispersive configuration. The latter may, for example, be substantially plano-convex with an axial width of the order of the axial thicknesses of the dispersive lens members bounding it; thus the width of this space may have a value intermediate the thicknesses of the two dispersive lens members. The second movable component may be a simple negative lens.

It has been found that the optical system just described enables the use of varifocal ratios as high as 6:1. A further improvement, in particular wtih respect to the relative aperture, is realizable with a modification of the principal or basic objective which, as in the issued patent, may consist of four air-spaced members but wherein the last of these members, in accordance with another feature of the instant invention, is a biconvex lens whose radii of curvature have absolute values with a ratio less than 1:3. Relative apertures as large as 1:1.8 have been achieved in this manner.

Even larger relative apertures, up to about 1:1.4, can be obtained if the second lens member of the basic objective, representing the sole negative member thereof, is constructed as a doublet with a strongly collective cemented surface.

The invention will be described in greater detail with reference to the accompanying drawing in which FIGS. 1 and 2 show two varifocal systems embodying the invention.

The system shown in FIG. 1 comprises a varifocal attachment, consisting of four components I–IV, and a fixed principal objective designated component V. The fixed front component I, of positive refractivity, consists of a nearly plano-convex singlet LI (radii $r1$, $r2$ and thickness $d1$), and separated from it by a small air space $d2$, of a doublet composed of a positive lens L2 (radii $r3$, $r4$ and thickness $d3$) and a negative lens L3 (radii $r4$, $r5$ and thickness $d4$). A variable air space $d5$ separates front component I from the negatively refracting first intermediate component II which consists of a nearly plano-concave doublet, composed of an approximately plano-convex lens L4 (radii $r6$, $r7$ and thickness $d6$) and a biconcave lens L5 (radii $r7$, $r8$ and thickness $d7$), and a nearly plano-concave singlet L6 (radii $r9$, $r10$ and thickness $d9$) separated from doublet L4, L5 by a small air space $d8$. Another variable air space $d10$ exists between lens L6 and the second intermediate component III, of negative refractivity, which consists of a single lens L7 in the shape of a negative meniscus (radii $r11$, $r12$ and thickness $d11$). Component III is separated by a variable air space $d12$ from the fixed, positively refracting rear component IV which consists of a positive lens L8 (radii $r13$, $r14$ and thickness $d13$) cemented onto a negative lens L9 (radii $r14$, $r16$ and thickness $d14$). The attachment I–IV retains its afocal character in all positions of adjustment.

The principal objective V, separated by a fixed air space $d15$ from component IV, is composed of four air-spaced lens members L10 (radii $r16$, $r17$ and thickness $d16$), L11 (radii $r18$, $r19$ and thickness $d18$), L12 (radii $r19$, $r20$ and thickness $d20$) and L13 (radii $r22$, $r23$ and thickness $d22$). These lens members, all singlets and of positive refractivity with the exception of the second member L11 of this group, are separated from one onother by air spaces $d17$, $d19$ and $d21$.

Representative numerical values for the radii $r1$ to $r23$ and the thicknesses and separations $d1$ to $d22$ of lenses L1 to L13, based upon a median focal length $f=100$ of the overall system for an intermediate position of adjustment substantially as illustrated, along with their refractive indices $n_d$ and their Abbé numbers $v$, are given in the following Table I for an objective of relative aperture 1:1.8, adjustable between a minimum focal length $f_{min}=40$ and a maximum focal length $f_{max}=240$ so as to have a varifocal ratio of 1:6; the values listed for the variable air spaces $d5$, $d10$ and $d12$, are given for the intermediate position shown.

Table I

| Lens | | Radii | Thicknesses and Separations | $n_d$ | $\nu$ |
|---|---|---|---|---|---|
| I | L1 | $r_1 = +336.43$ | $d_1 = 29.50$ | 1.62041 | 60.3 |
| | | $r_2 = -1572.38$ | $d_2 = 0.65$ | Air Space | |
| | L2 | $r_3 = +209.80$ | $d_3 = 27.50$ | 1.56873 | 63.1 |
| | | $r_4 = +8327.00$ | $d_4 = 6.00$ | 1.80518 | 25.5 |
| | L3 | $r_5 = +365.09$ | $d_5 = 103.00$ | Variable Air Space | |
| II | L4 | $r_6 = +1875.45$ | $d_6 = 13.50$ | 1.80518 | 25.5 |
| | | $r_7 = -261.36$ | $d_7 = 4.75$ | 1.58913 | 61.2 |
| | L5 | $r_8 = +147.49$ | $d_8 = 10.00$ | Air Space | |
| | L6 | $r_9 = -1905.46$ | $d_9 = 7.50$ | 1.62041 | 60.3 |
| | | $r_{10} = +85.22$ | $d_{10} = 35.60$ | Variable Air Space | |
| III | L7 | $r_{11} = -57.36$ | $d_{11} = 5.00$ | 1.62041 | 60.3 |
| | | $r_{12} = -117.13$ | $d_{12} = 55.36$ | Variable Air Space | |
| IV | L8 | $r_{13} = +1025.25$ | $d_{13} = 9.75$ | 1.65830 | 57.3 |
| | | $r_{14} = -92.32$ | $d_{14} = 4.75$ | 1.78470 | 26.1 |
| | L9 | $r_{15} = -123.33$ | $d_{15} = 37.50$ | Air Space | |
| V | O10 | $r_{16} = +62.21$ | $d_{16} = 21.20$ | 1.67003 | 47.2 |
| | | $r_{17} = -350.83$ | $d_{17} = 16.90$ | Air Space | |
| | L11 | $r_{18} = -66.02$ | $d_{18} = 4.80$ | 1.80518 | 25.5 |
| | | $r_{19} = +86.32$ | $d_{19} = 7.65$ | Air Space | |
| | L12 | $r_{20} = -214.40$ | $d_{20} = 10.75$ | 1.67790 | 55.5 |
| | | $r_{21} = -62.67$ | $d_{21} = 0.15$ | Air Space | |
| | L13 | $r_{22} = +71.57$ | $d_{22} = 12.85$ | 1.62041 | 60.3 |
| | | $r_{23} = -386.59$ | | | |
| | | | $d_{\text{total}} = 424.66$ | | |

The air spaces $d_5$, $d_{10}$ and $d_{12}$ may be varied concurrently in order to change the overall focal length of the system between a minimum value $f_{\min} = 40$ and a maximum value $f_{\max} = 240$ in accordance with the following table:

Table IA

| Overall Focal Length | Variable Air Spaces | | |
|---|---|---|---|
| | $d_5$ | $d_{10}$ | $d_{12}$ |
| 40 | 0.41 | 137.45 | 50.10 |
| 100 | 103.00 | 35.60 | 55.36 |
| 180 | 145.71 | 13.40 | 34.85 |
| 240 | 161.08 | 18.58 | 14.30 |

The focal lengths $f_I$ and $f_V$ of the positive front component I and the basic objective V can be calculated as +337.43 and +94.90, respectively, their ratio being thus less than 4:1. The absolute value of the ratio of the radii $r22$ and $r23$ of the last, biconvex lens member L13 of the basic objective, given as +71.57 and −386.59, respectively, is less than 1:3.

The modified system of FIG. 2 includes a varifocal attachment I' to IV', composed of lenses L1' to L9' (radii $r1'$ to $r15'$, thicknesses and separations $d16'$ to $d23'$), separated from each other by an air space $d15'$. Components I' and II' are identical with components I and II of FIG. 1. The lenses L7', L8' L9' and L10' are similar to lenses L7, L8, L9 and L10, respectively, and the last lens L14' is of the same general construction as lens L13, but the two intermediate lens members of objective V' differ considerably from the corresponding members of objective V. Thus, the negatively refracting second lens member of component V' consists of a positive meniscus L11' (radii $r18'$, $r19'$ and thickness $d18'$) cemented onto a biconvex lens L12' (radii $r19'$, $r20'$ and thickness $d19'$), their common surface $r19'$ being strongly curved toward the image side of the system and being collective in character since the lens L11' has a higher index of refraction than its mate L12'. Also, the third lens member L13' of component V' is biconvex in contradistinction to the meniscus-shaped lens member L12 in FIG. 1.

Representative values for the parameters of the system of FIG. 2 are listed in the following Table II for an objective of relative aperture 1:1.4 and a varifocal ratio similar to that of the system of Table I.

The focal length $f_{I'}$ of component I' equals +337.43, being the same as that of component I; the focal length $f_{V'}$ of component V can be calculated as +95.03, the ratio of the two focal lengths thus being again less than 1:3. The ratio of the absolute values of the radii $r23'$, $r24'$ of the last lens member L14' given as +69.12 and −275.16, respectively, satisfies the requirement of being less than 1:3.

Table II

| Lens | | Radii | Thicknesses and Separations | $n_d$ | $\nu$ |
|---|---|---|---|---|---|
| I' | L1' | $r_{1'} = +336.43$ | $d_{1'} = 29.50$ | 1.62041 | 60.3 |
| | | $r_{2'} = -1572.38$ | $d_{2'} = 0.65$ | Air Space | |
| | L2' | $r_{3'} = +209.80$ | $d_{3'} = 27.50$ | 1.56873 | 63.1 |
| | | $r_{4'} = +8327.00$ | $d_{4'} = 6.00$ | 1.80518 | 25.5 |
| | L3' | $r_{5'} = +365.09$ | $d_{5'} = 103.00$ | Variable Air Space | |
| II' | L4' | $r_{6'} = +1875.45$ | $d_{6'} = 13.50$ | 1.80518 | 25.5 |
| | | $r_{7'} = -261.36$ | $d_{7'} = 4.75$ | 1.58918 | 61.2 |
| | L5' | $r_{8'} = +147.49$ | $d_{8'} = 10.00$ | Air Space | |
| | L6' | $r_{9'} = -1905.46$ | $d_{9'} = 7.50$ | 1.62041 | 60.3 |
| | | $r_{10'} = +85.22$ | $d_{10'} = 35.60$ | Variable Air Space | |
| III' | L7' | $r_{11'} = -63.17$ | $d_{11'} = 5.00$ | 1.62041 | 60.3 |
| | | $r_{12'} = -142.58$ | $d_{12'} = 53.26$ | Variable Air Space | |
| IV' | L8' | $r_{13'} = +980.99$ | $d_{13'} = 13.75$ | 1.65830 | 57.3 |
| | | $r_{14'} = -92.32$ | $d_{14'} = 4.75$ | 1.78470 | 26.1 |
| | L9' | $r_{15'} = -123.33$ | $d_{15'} = 37.50$ | Air Space | |
| V' | L10' | $r_{16'} = +64.22$ | $d_{16'} = 19.45$ | 1.61720 | 54.0 |
| | | $r_{17'} = -377.59$ | $d_{17'} = 19.10$ | Air Space | |
| | L11' | $r_{18'} = -68.42$ | $d_{18'} = 13.85$ | 1.7200 | 50.3 |
| | L12' | $r_{19'} = -35.58$ | $d_{19'} = 4.60$ | 1.64831 | 33.8 |
| | | $r_{20'} = +58.11$ | $d_{20'} = 9.85$ | Air Space | |
| | L13' | $r_{21'} = +153.64$ | $d_{21'} = 11.70$ | 1.62041 | 60.3 |
| | | $r_{22'} = -143.63$ | $d_{22'} = 0.55$ | Air Space | |
| | L14' | $r_{23'} = +69.12$ | $d_{23'} = 18.50$ | 1.62041 | 60.3 |
| | | $r_{24'} = -275.16$ | | | |
| | | | $d_{\text{total}'} = 449.86$ | | |

Again, the overall focal length may be varied between the aforementioned limiting values in accordance with the following table:

Table IIA

| Overall Focal Length | Variable Air Spaces | | |
|---|---|---|---|
| | $d_5'$ | $d_{10}'$ | $d_{12}'$ |
| 40 | 6.41 | 137.45 | 48.00 |
| 100 | 103.00 | 35.60 | 53.26 |
| 180 | 145.71 | 13.40 | 32.75 |
| 240 | 161.08 | 18.58 | 12.20 |

What is claimed is:

1. An optical objective system comprising a principal objective and an afocal attachment in front of said principal objective; said attachment consisting of four components separated from one another by variable air spaces, said components including a fixed front component of positive refractivity, a first intermediate component of negative refractivity, a second intermediate component of negative refractivity and a fixed rear component of positive refractivity, said first and second intermediate components being movable, relatively to each other and to said front and rear components, into a first position in which the system has a relatively small focal length and a second position in which the system has a relatively large focal length; said rear component having a focal length equal to at most 75% of the focal length of said front component; said front component having a focal length less than four times the focal length of said principal objective; said first intermediate component consisting of two closely juxtaposed lens members of negative refractivity separated by an air space of negative configuration, said lens members being of substantially planoconcave shape with concave rear surfaces and including a singlet preceded by a doublet with a forwardly concave collective cemented surface, said singlet and said doublet each having a concave rear surface, the rear surface of said singlet being more strongly curved than that of said doublet; said principal objective consisting of four airspaced lens members including a positive first member, a negative second member, a positive third member and a positive fourth member, said fourth member being a biconvex lens with front and rear surfaces respectively having a shorter and a longer radius of curvature with an absolute ratio less than 1:3.

2. A system as defined in claim 1 wherein the radii $r1$ to $r23$ and the thicknesses and separations $d1$ to $d22$ of the lenses L1 to L13 forming part of said front component I, said first intermediate component II, said second intermediate component III, said rear component IV and said basic objective V, based upon an overall focal length for said system whose median numerical value is 100, the indices of refraction $n_d$ of all of said lenses and their Abbé numbers $\nu$ have numerical values substantially as given in the following table, the separations $d5$, $d10$ and $d12$ each having a first value corresponding to said first position and a second value corresponding to said second position:

| | Lens | Radii | Thicknesses and Separations | $n_d$ | $\nu$ |
|---|---|---|---|---|---|
| I | L1 | $r_1=+336.43$ | $d_1=29.50$ | 1.62041 | 60.3 |
| | | $r_2=-1572.38$ | $d_2=0.65$ | Air Space | |
| | L2 | $r_3=+209.80$ | $d_3=27.50$ | 1.56873 | 63.1 |
| | L3 | $r_4=+8327.00$ | $d_4=6.00$ | 1.80518 | 25.5 |
| | | $r_5=+365.09$ | $d_5=\begin{matrix}^1 103.00\\^2 145.71\end{matrix}$ | Air Space | |
| II | L4 | $r_6=+1875.45$ | $d_6=13.50$ | 1.80518 | 25.5 |
| | L5 | $r_7=-261.36$ | $d_7=4.75$ | 1.58913 | 61.2 |
| | | $r_8=+147.49$ | $d_8=10.00$ | Air Space | |
| | L6 | $r_9=-1905.46$ | $d_9=7.50$ | 1.62041 | 60.3 |
| | | $r_{10}=+85.22$ | $d_{10}=\begin{matrix}^1 35.60\\^2 13.40\end{matrix}$ | Air Space | |
| III | L7 | $r_{11}=-57.36$ | $d_{11}=5.00$ | 1.62041 | 60.3 |
| | | $r_{12}=-117.13$ | $d_{12}=\begin{matrix}^1 55.36\\^2 34.85\end{matrix}$ | Air Space | |
| IV | L8 | $r_{13}=+1025.25$ | $d_{13}=9.75$ | 1.65830 | 57.3 |
| | L9 | $r_{14}=-92.32$ | $d_{14}=4.75$ | 1.78470 | 26.1 |
| | | $r_{15}=-123.33$ | $d_{15}=37.50$ | Air Space | |
| V | L10 | $r_{16}=+62.21$ | $d_{16}=21.20$ | 1.67003 | 47.2 |
| | | $r_{17}=-350.83$ | $d_{17}=16.90$ | Air Space | |
| | L11 | $r_{18}=-66.02$ | $d_{18}=4.80$ | 1.80518 | 25.5 |
| | | $r_{19}=+86.32$ | $d_{19}=7.65$ | Air Space | |
| | L12 | $r_{20}=-214.40$ | $d_{20}=10.75$ | 1.67790 | 55.5 |
| | | $r_{21}=-62.67$ | $d_{21}=0.15$ | Air Space | |
| | L13 | $r_{22}=+71.57$ | $d_{22}=12.85$ | 1.62041 | 60.3 |
| | | $r_{23}=-386.59$ | | | |

¹ First position.
² Second position.

3. A system as defined in claim 2 wherein said intermediate components are also movable into a third position of minimum focal length and a fourth position of maximum focal length, the separations $d5$, $d10$ and $d12$ having substantially the values 0.41, 137.45 and 50.10, respectively, in said third position and the values 161.08, 18.58 and 14.30, respectively, in said fourth position.

4. A system as defined in claim 1 wherein said second member is a doublet with a strongly collective cemented surface curved toward the image side of the system.

5. A system as defined in claim 4 wherein the radii $r1'$ to $r24'$ and the thicknesses and separations $d1'$ to $d23'$ of the lenses L1' to L14' forming part of said front component I', said first intermediate component II', said second intermediate component III', said rear component IV' and said basic objective V', based upon an overall focal length for said system whose median numerical value is 100, the indices of refraction $n_d$ of all of said lenses and their Abbé numbers $\nu$ have numerical values substantially as given in the following table, the separations $d5'$, $d10'$ and $d12'$ each having a first value corresponding to said first position and a second value corresponding to said second position:

| Lens | | Radii | Thicknesses and Separations | $n_d$ | $\nu$ |
|---|---|---|---|---|---|
| I' | L1' | $r_{1'} = +336.43$ | $d_{1'} = 29.50$ | 1.62041 | 60.3 |
| | | $r_{2'} = -1572.38$ | $d_{2'} = 0.65$ | Air Space | |
| | L2' | $r_{3'} = +209.80$ | $d_{3'} = 27.50$ | 1.56873 | 63.1 |
| | L3' | $r_{4'} = +8327.00$ | $d_{4'} = 6.00$ | 1.80518 | 25.5 |
| | | $r_{5'} = +365.09$ | $d_{5'} =$ [1] 103.00 [2] 145.71 | Air Space | |
| II' | L4' | $r_{6'} = +1875.45$ | $d_{6'} = 13.50$ | 1.80518 | 25.5 |
| | L5' | $r_{7'} = -261.36$ | $d_{7'} = 4.75$ | 1.58918 | 61.2 |
| | | $r_{8'} = +147.49$ | $d_{8'} = 10.00$ | Air Space | |
| | L6' | $r_{9'} = -1905.46$ | $d_{9'} = 7.50$ | 1.62041 | 60.3 |
| | | $r_{10'} = +85.22$ | $d_{10'} =$ [1] 35.60 [2] 13.40 | Air Space | |
| III' | L7' | $r_{11'} = -63.17$ | $d_{11'} = 5.00$ | 1.62041 | 60.3 |
| | | $r_{12'} = -142.58$ | $d_{12'} =$ [1] 53.26 [2] 32.75 | Air Space | |
| IV' | L8' | $r_{13'} = +980.99$ | $d_{13'} = 13.75$ | 1.65830 | 57.3 |
| | L9' | $r_{14'} = -92.32$ | $d_{14'} = 4.75$ | 1.78470 | 26.1 |
| | | $r_{15'} = -123.33$ | $d_{15'} = 37.50$ | Air Space | |
| V' | L10' | $r_{16'} = +64.22$ | $d_{16'} = 19.45$ | 1.61720 | 54.00 |
| | | $r_{17'} = -377.59$ | $d_{17'} = 19.10$ | Air Space | |
| | L11' | $r_{18'} = -68.42$ | $d_{18'} = 13.85$ | 1.7200 | 50.3 |
| | L12' | $r_{19'} = -35.58$ | $d_{19'} = 4.60$ | 1.64831 | 33.8 |
| | | $r_{20'} = +58.11$ | $d_{20'} = 9.85$ | Air Space | |
| | L13' | $r_{21'} = +153.64$ | $d_{21'} = 11.70$ | 1.62041 | 60.3 |
| | | $r_{22'} = -143.63$ | $d_{22'} = 0.55$ | Air Space | |
| | L14' | $r_{23'} = +69.12$ | $d_{23'} = 18.50$ | 1.62041 | 60.3 |
| | | $r_{24'} = -275.16$ | | | |

[1] First position.
[2] Second position.

6. A system as defined in claim 5 wherein said intermediate components are also movable into a third position of minimum focal length and a fourth position of maximum focal length, the separations $d5'$, $d10'$ and $d12'$ having substantially the values 6.41, 137.45 and 48.00, respectively, in said third position and the values 161.08, 18.58 and 12.20, respectively, in said fourth position.

References Cited by the Examiner
UNITED STATES PATENTS

| | | | |
|---|---|---|---|
| 2,847,907 | 8/1958 | Angenieux | 88—57 |
| 3,000,259 | 9/1961 | Turula et al. | 88—57 |
| 3,027,805 | 4/1962 | Yamaji | 88—57 |

JEWELL H. PEDERSEN, *Primary Examiner.*

R. J. STERN, *Assistant Examiner.*